United States Patent

Burst et al.

Patent Number: 5,297,837
Date of Patent: Mar. 29, 1994

[54] INFLATABLE ROOF FOR A MOTOR VEHICLE

[75] Inventors: Hermann Burst; Dieter Raisch, both of Rutesheim; Matthias Aydt, Eberdingen; Walter Braun, Sindelfingen; August-Wilhelm Goesse, Mönsheim, all of Fed. Rep. of Germany

[73] Assignee: Dr. Ing. h.c.F. Porsche AG, Fed. Rep. of Germany

[21] Appl. No.: 934,657

[22] PCT Filed: Jul. 6, 1991

[86] PCT No.: PCT/EP91/01263
§ 371 Date: Jan. 25, 1993
§ 102(e) Date: Jan. 25, 1993

[87] PCT Pub. No.: WO92/01581
PCT Pub. Date: Feb. 6, 1992

[30] Foreign Application Priority Data
Jul. 23, 1990 [DE] Fed. Rep. of Germany ....... 4023348

[51] Int. Cl.⁵ .................................................. B60J 7/00
[52] U.S. Cl. ...................................... 296/212; 296/216
[58] Field of Search ................... 296/212, 210, 216

[56] References Cited

U.S. PATENT DOCUMENTS

| | | | |
|---|---|---|---|
| 1,809,455 | 6/1931 | Seitz | 296/212 |
| 2,111,458 | 3/1938 | McHargue | 296/212 |
| 2,838,341 | 6/1958 | Watson | 296/212 |
| 3,050,334 | 8/1962 | Geiger | 296/107 |
| 3,227,486 | 1/1966 | Scott | 296/117 |

FOREIGN PATENT DOCUMENTS

| | | | |
|---|---|---|---|
| 0166671 | 1/1986 | European Pat. Off. | |
| 1216440 | 4/1960 | France | |
| 1515149 | 3/1968 | France | |
| 99476 | 4/1990 | Japan | 296/212 |
| 303985 | 12/1990 | Japan | 296/212 |

Primary Examiner—Joseph D. Pape
Attorney, Agent, or Firm—Evenson, McKeown, Edwards & Lenahan

[57] ABSTRACT

An inflatable roof for a passenger car extends in the inflated condition between a windshield frame and a rear area of the vehicle body and is divided into a plurality of air chambers. So that, while the drag coefficient is acceptable, a sufficient stiffness of the roof is achieved and, furthermore, any balloon-like swelling-up of the roof during the inflating of the air chambers is avoided, it is provided that the roof has air chambers with different pressure levels (operating pressure).

22 Claims, 6 Drawing Sheets

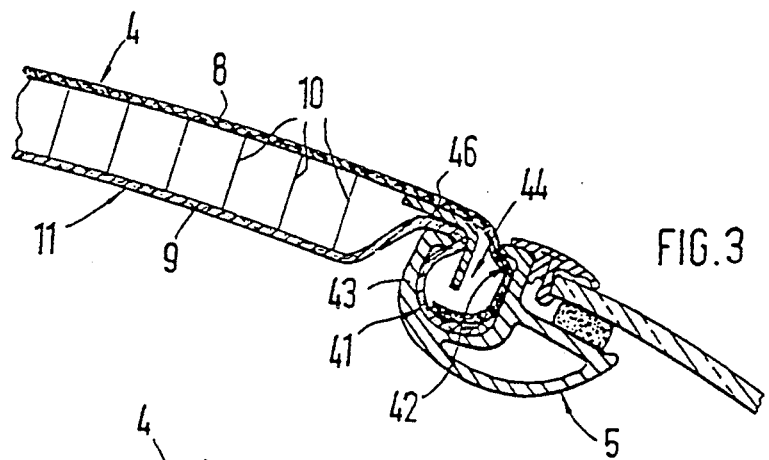
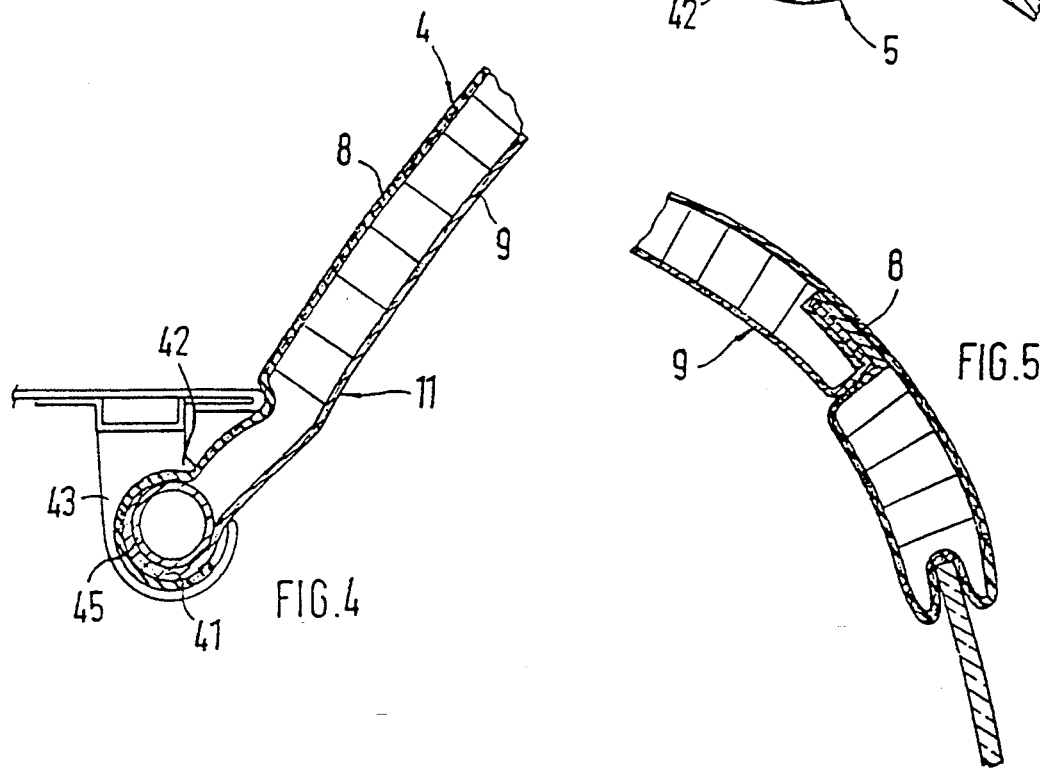
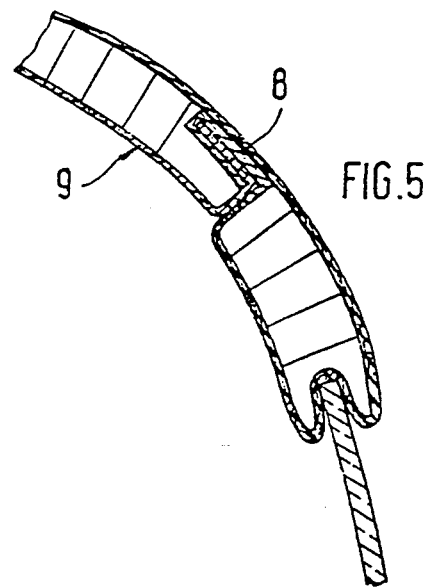
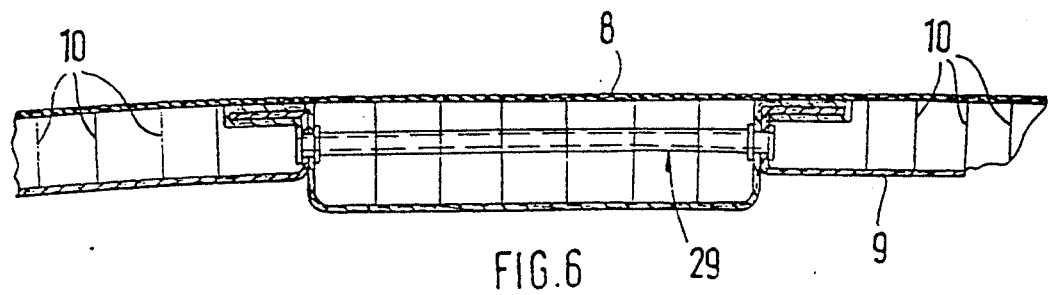

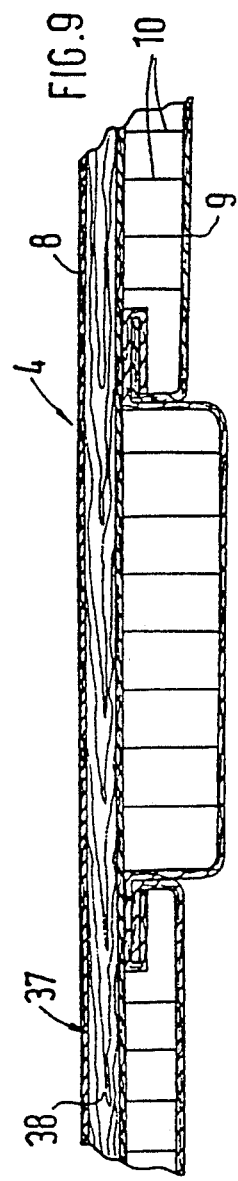
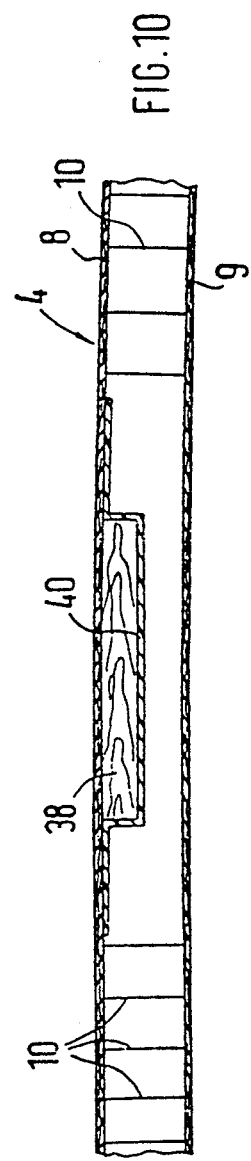
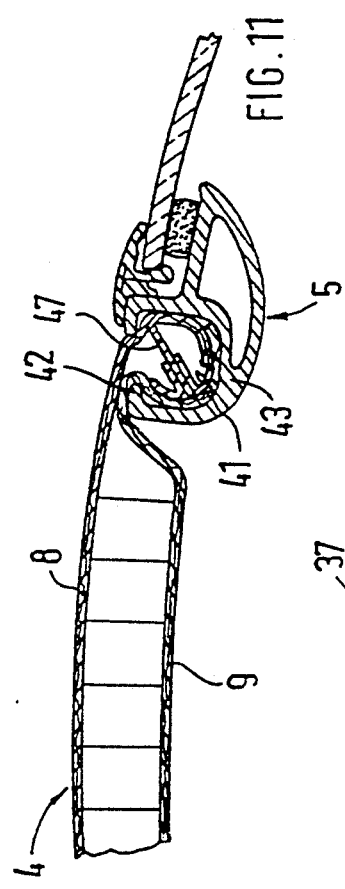

INFLATABLE ROOF FOR A MOTOR VEHICLE

BACKGROUND AND SUMMARY OF THE INVENTION

The invention relates to an inflatable roof for a vehicle, particularly a passenger car, which, in the inflated condition, extends between a windshield frame and a rear area of the vehicle body, the roof being divided into a plurality of air chambers.

In the case of a known inflatable roof of the initially mentioned type (U.S. Pat. No. 3,227,486), the whole roof area is divided into adjacent, longitudinally directed air chambers which are constructed in a tube shape, in which case the roof is constructed as a two-chamber system so that, in the case of a defect of one air chamber, the function of the roof is maintained at least to a limited degree. The air chambers of the two chamber systems in this case have the same operating pressure.

Because of the shell-side grooves between the respective adjacent air chambers, this roof has no smooth-surface shell, whereby the drag coefficient is increased. In addition, there is the problem that, although when the air chambers are inflated tautly, a sufficient stiffness of the roof is achieved, in the case of such an inflating, the roof swells up in the manner of a balloon, which is not desirable.

It is an object of the invention to further develop an inflatable roof in such a manner that, while the drag coefficient is acceptable, a sufficient stiffness of the roof is achieved and that, in addition, a balloon-type swelling-up of the roof is avoided.

According to the invention, this object is achieved by means of an arrangement wherein an inflatable roof for a vehicle, particularly a passenger car which extends in the inflated condition between a windshield frame and a rear area of the vehicle body, the roof being divided into a plurality of air chambers, wherein the roof has air chambers with different operating pressure levels.

The principal advantages achieved by means of the invention are that, by means of the development of a frame or supporting structure with a relatively high operating pressure and by means of zones which are situated in-between and have a significantly lower operating pressure, an inflatable roof is provided which has sufficient stiffness and which, in the process, does not swell up in the manner of a balloon. In addition, the charging time is reduced as a result of the different operating pressures in the individual air chambers. The shape of the roof is determined by the frame or supporting structure; the areas situated in-between only have a shape-supporting effect.

By means of the arrangement of additional shaping elements, the dimensional stability of the roof is increased further. The bead-type end areas of the circumference-side first air chamber of the frame or supporting structure permit, in connection with the undercut receiving devices on the windshield frame and in the rear area, a simple fastening of the roof on the vehicle body. In the evacuated condition the roof can be stored, in a rolled-up state, in a relatively small storage compartment of the rear area.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged sectional view according to Line III—III of FIG. 1;

FIG. 4 is an enlarged sectional view according to Line IV—IV of FIG. 1;

FIG. 5 is an enlarged sectional view according to Line V—V of FIG. 1;

FIG. 6 is an enlarged sectional view according to Line VI—VI of FIG. 1;

FIG. 9 is an enlarged sectional view according to Line IX—IX of FIG. 7;

FIG. 10 is an enlarged sectional view according to Line X—X of FIG. 7;

FIG. 11 is a sectional view corresponding to FIG. 3 with another embodiment of a fastening of the inflatable roof on the windshield frame; and FIG. 12 is a view in the direction of the arrow R of FIG. 7 of a shaping element with a different cross-section.

DETAILED DESCRIPTION OF THE DRAWINGS

Figure 1:
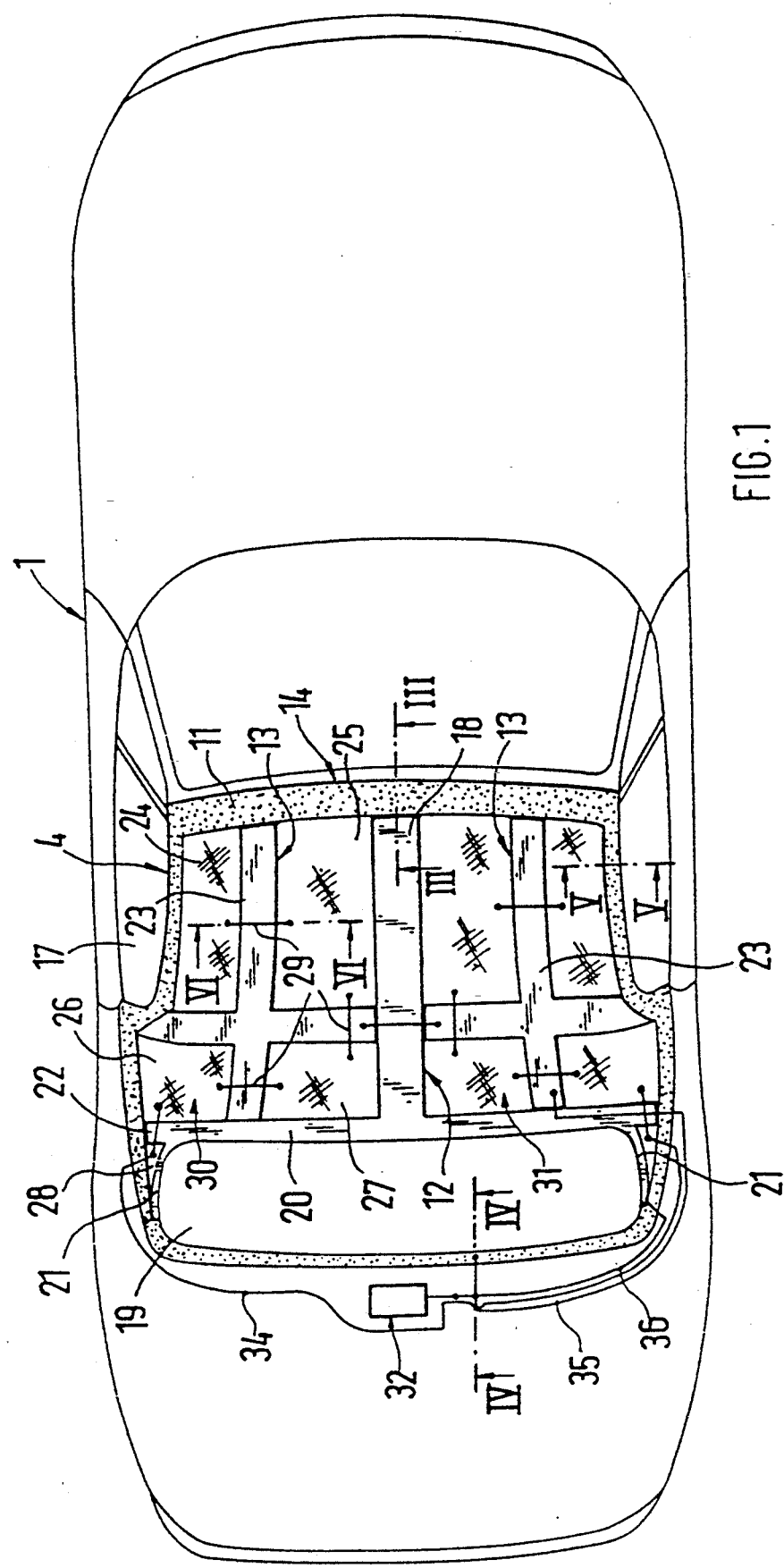
FIG. 1 is a top view of a passenger car with an inflatable roof
Figure 2:
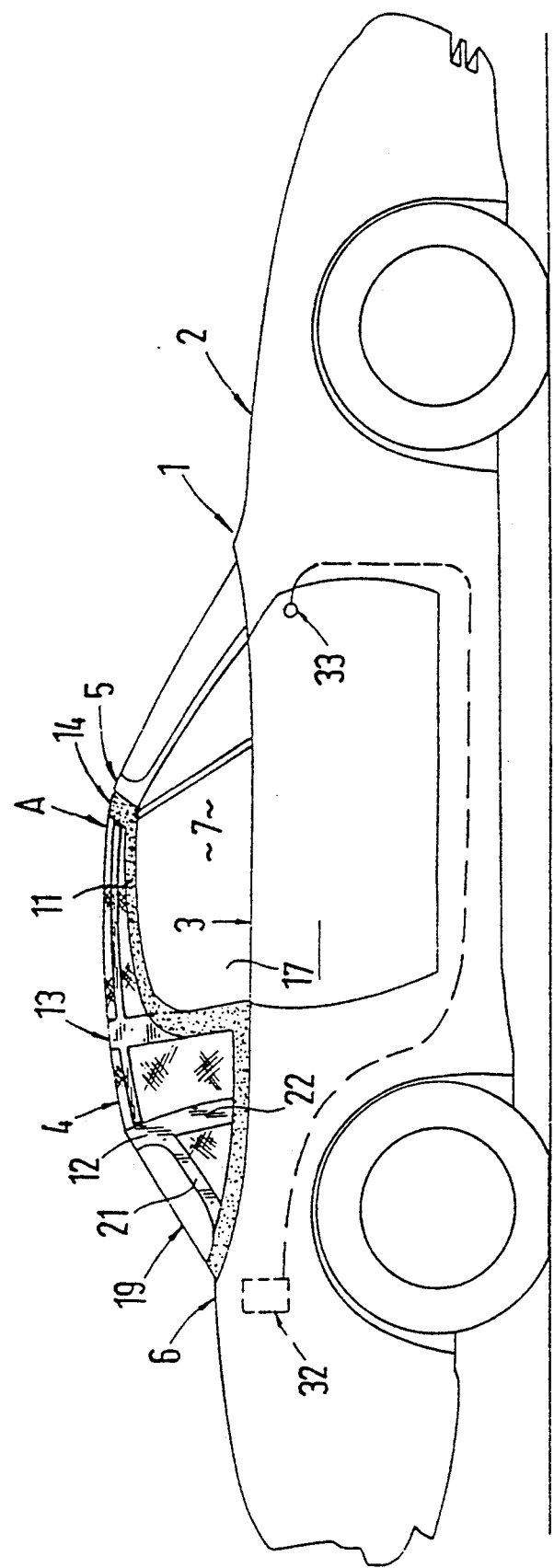
FIG. 2 is a lateral view of FIG. 1.

FIGS. 1 and 2 illustrate a passenger car 1 comprising a vehicle body 2, in which case a roof 4 that can be inflated or evacuated is arranged above a belt line 3, which roof 4, in the inflated condition A (closed roof), extends between a windshield frame 5 and a rear area 6 and covers a passenger compartment 7 in the upward direction. After the roof 4 is evacuated, it may be rolled up and may be stored in a receiving compartment of the rear area 6 which is not shown in detail, only little space being required for the storing of the rolled-up roof 4.

The roof 4 essentially consists of layers 8, 9 made of a flexible, resistant and airtight material which are arranged at a distance from one another and are connected with one another locally by way of a large-surface glued connection (FIGS. 3 to 6). A double textile fabric (rubberized looped fabric), for example, which is covered on the exterior side in an airtight manner, is suitable to be used as the material. Threads 10 extend locally between the two layers 8, 9 and are used as spacing elements so that the two layers 8, 9 extend at a desired uniform distance with respect to one another in the inflated condition.

The whole roof 4 is divided into a plurality of air chambers which have different shapes and surfaces, in which case at least groups of air chambers have different pressure levels (operating pressure). According to FIG. 1, the roof comprises a frame or supporting structure 14 which is composed of several air chambers 11, 12, 13 and determines the shape of the roof 4. In the air chambers 11, 12, 13 of the frame or supporting structure 14, the operating pressure is significantly larger (higher) than in the air chambers which are situated in-between.

In the embodiment shown, the frame or supporting structure 14 of the roof 4 is composed of three mutually independent air chambers 11, 12, 13. A first air chamber 11 of the frame or supporting structure 14 extends along the circumference of the roof 4 and, when the roof is closed 4, interacts with the windshield frame 5, the two door window panes 17, which are constructed without a frame, as well as, at the level of the belt line 3, with the vehicle body structure. A second air chamber 12 of the frame or supporting structure 14 of the roof 4 comprises a longitudinally directed section 18 which extends approximately in the vehicle center and whose forward end extends to the first air chamber 11, whereas the rearward end leads into a transversely extending section 20 which borders the upper edge of a rear window 19.

The transversely extending section 20 is divided on its two laterally exterior areas into two arms 21, 22 respectively, in which case one arm 21 extends adjacent to a lateral edge of the rear window 19, while the second arm 22 extends as a continuation of the transversely extending rearward section 20 in the direction of the belt line 3 and is butt-jointed to the first air chamber 11. All end sections of the second air chamber 12 extend to the exterior first air chamber 11.

A third air chamber 13 of the frame or supporting structure 14 comprises two sections 23 which are constructed in a cross shape, in which case each cross-shaped section 23 extends with its free ends to the first and the second air chamber 11, 12. A longitudinally directed leg of each cross-shaped section 23 is connected in the front to the first and in the rear to the second air chamber, whereas the transversely directed leg connects the exterior first air chamber 11 and the interior longitudinally directed section 18 of the second air chamber 12 with one another.

As a result of the cross-shaped development of the third air chamber 13 and the two lateral arms 21, 22 of the second air chamber 12, in the embodiment shown, an additional five air chambers 24, 25, 26, 27, 28 are formed on each roof half which are in an operating connection with one another by way of connecting lines 29. The connecting lines 29 are guided transversely through sections of the first and second air chambers 11, 12 (FIG. 6). The air chambers 24 to 28 between the frame or supporting structure 14 have a much lower operating pressure than the frame or supporting structure 14. The operating pressure in the frame or supporting structure 14 is approximately twice as large as in the air chambers 24 to 28. It is provided that the five air chambers 24 to 28 of each roof half form a separate air chamber system 30, 31 so that, when one air chamber system (for example, 30) fails, the function of the roof 4 is largely maintained.

A compressor 32 for the inflating or discharging of compressed air for the roof 4 which is arranged in the rear means of a switch 33 from the passenger compartment 7 and, by way of lines 34, 35, 36, is connected with the three air chambers 11, 12, 13 of the frame or supporting structure 14 and the two air chamber systems 30, 31 with the lower operating pressure.

In the feed line 34 to the air chamber system 30, 31 with the lower operating pressure, a pressure control valve is installed, which is not shown in detail, so that these air chambers can be inflated to a defined operating pressure.

Figure 7:
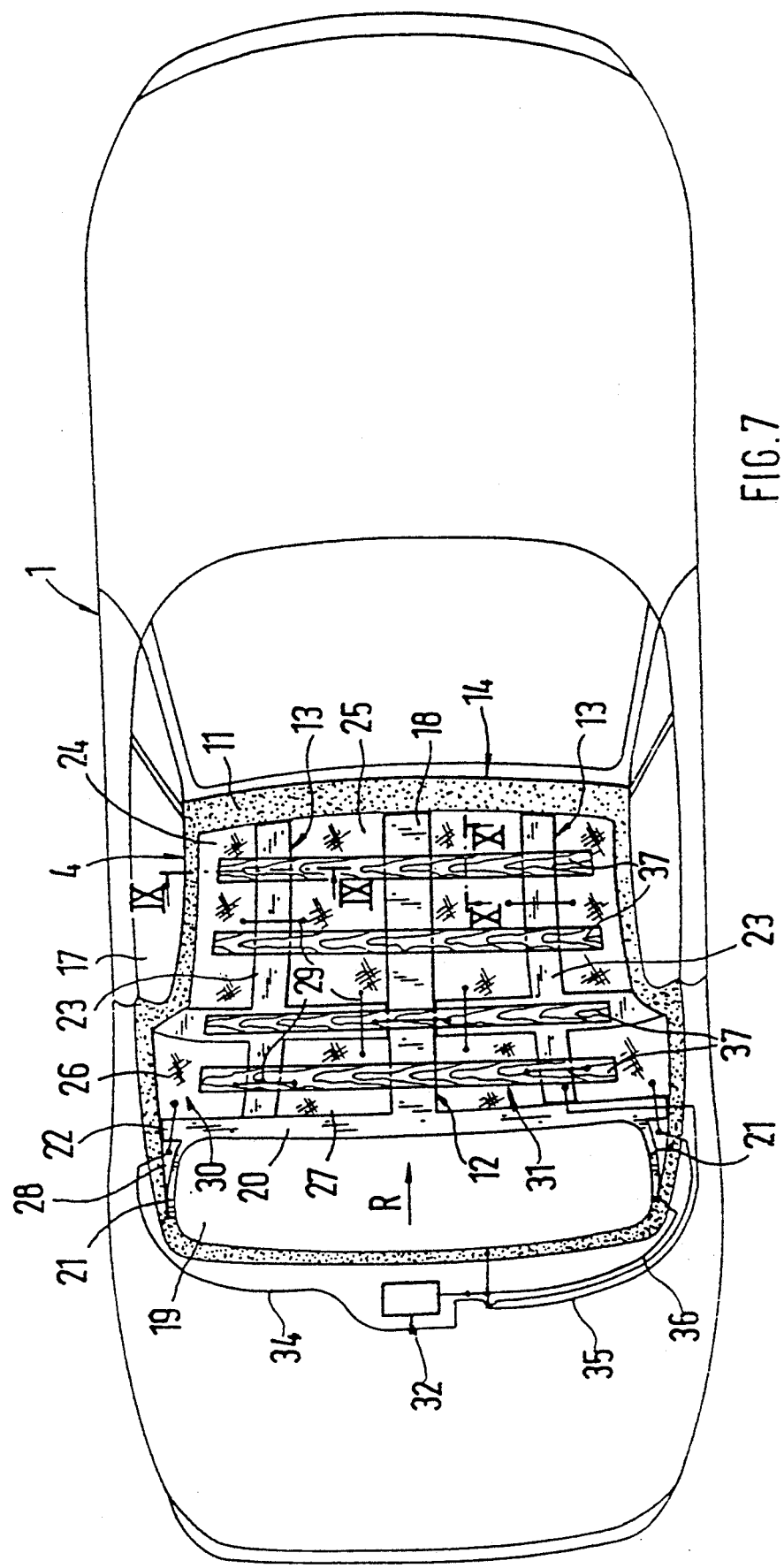
FIG. 7 is a view corresponding to FIG. 1 of another embodiment of an inflatable roof.
Figure 8:
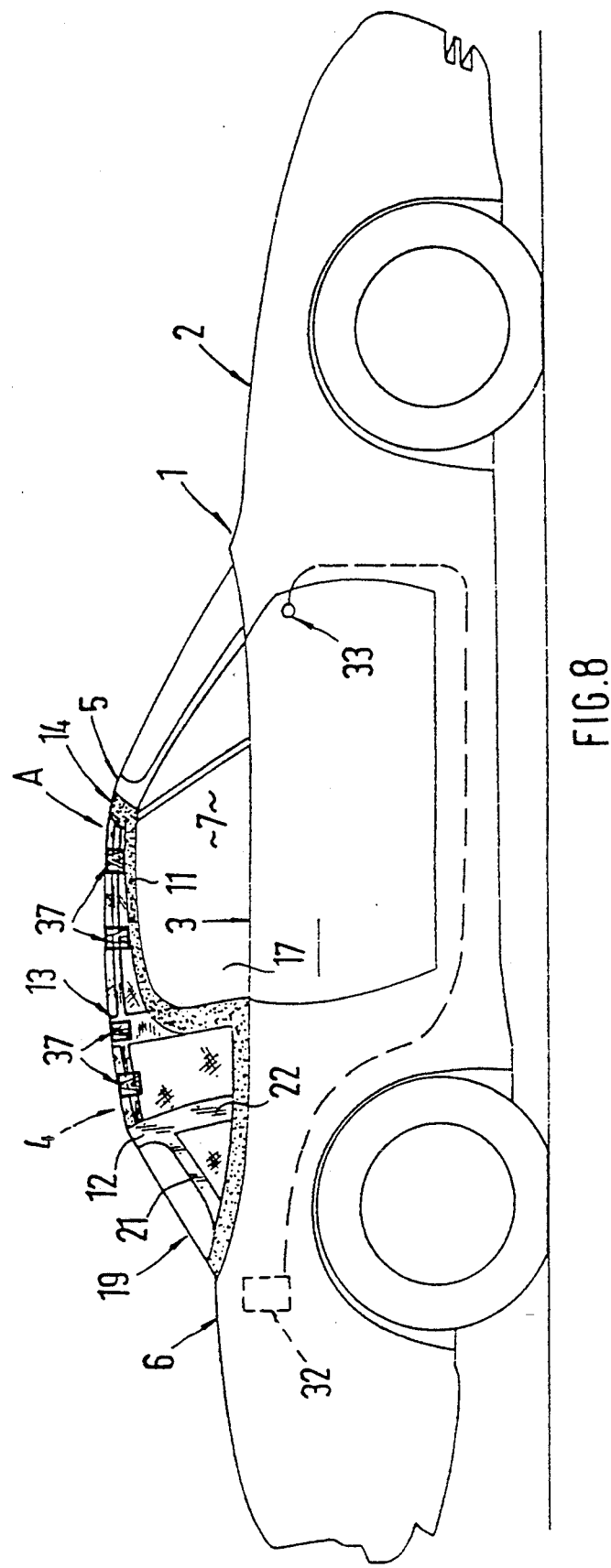
FIG. 8 is a lateral view of FIG. 7.

In the case of a second embodiment (FIG. 7 and 8), in addition to the shape support of the roof 4, several shaping elements 37 are provided which are arranged at a distance from one another and extend in the transverse direction of the vehicle. The shaping elements 37 are formed by slats 38 made of wood or plastic which, corresponding to a first variant, have a uniform cross-section and are bent forward according to the desired dimensioning of the roof 4.

In the case of a second variant, it is provided that the shaping elements 37 have a linear dimension along their longitudinal course and are provided with different cross-sections in the partial areas of their longitudinal course. According to FIG. 12, the shaping elements 37 have, adjacent of lateral end areas, sections 39 with a reduced cross-section. The shaping elements 37 are placed in receiving pockets 40 which are fastened on the inside to the outer layer 8 of the roof 4 (FIG. 10). The receiving pockets 40 are connected with the outer layer 8 of the roof 4 by means of gluing. The shaping elements 38 are fitted loosely into the receiving pockets 40 and extend along a significant portion of the width of the roof 4. They end shortly before the laterally exterior sections of the first air chamber 11.

On its lower end area along the belt line 3, the roof 4 is fastened to the adjacent vehicle body (rear area 6). This may take place by means of snap fasteners, a zipper or other quick-fastening elements. In addition, a detachable connection is provided between the forward edge of the roof 4 and the windshield frame 5.

A particularly easy fastening of the roof 4 on the vehicle body 2 is achieved in that the circumference-side first air chamber 11 of the frame or supporting structure 14 in the area of the windshield frame 5 and of the rear area 6 has a bead-shaped end area 41 which can be inserted into a receiving device 43 of the windshield frame 5 and of the rear area 6 which is provided with an undercut 42. Inside the bead-shaped end area, devices 44 are arranged which fix the bead-shaped end area 41 inside the receiving device 43.

As shown in FIGS. 3 and 4, the devices 44 includes an angle bracket 46 and a flexible tube 45, respectively.

Along the curved rear area 6, it is provided that a flexible tube 45 for the fixing of the roof 4 is pushed into the bead-shaped end area 41 or the receiving device 43 (FIG. 4). The introducing of the flexible tube 45 represents a one-time mounting operation because the rearward end area of the roof 4 is always fixedly connected with the adjacent vehicle body 2. In the area of the windshield frame 5, it is provided that a plastic angle bracket 46 is glued on in the area of the bead-shaped end area 41 of the roof 4 which is used as an introducing aid for the end area 41. A leg of this plastic angle bracket extends in parallel to the two layers 8, 9 of the roof 4, whereas the other leg extends downward approximately at a right angle in the direction of the receiving device 43 (FIG. 3).

According to a second embodiment (FIG. 11), a slat 47 is inserted inside the transversely extending bead-shaped end area 41 of the roof 4, this slat 47 being disposed in a transverse position after the end area 41 is inserted into the receiving device 43.

In the case of the arrangement according to the invention, the shape of the roof 4 is determined by the frame or supporting structure 14, whereas the air chambers 24 to 28 with the lower operating pressure only have a shape-supporting effect. The individual air chambers of the frame or supporting structure 14 are secured with respect to one another by means of valves which are not shown in detail.

The mounting of a rolled-up roof 4 takes place in such a manner that the roof 4 is unrolled and is then filled to a medium pressure level in which it takes on its approximate shape.

During the filling, the first air chamber 11 is filled first; then the second and third air chamber 12, 13 of the frame and supporting structure 14 are filled; and finally the remaining air chambers 24 to 28 are filled.

At the medium pressure level, the forward bead-shaped end area 41 can easily be introduced into the receiving device 43 of the windshield frame 5 and can be fastened. Then the roof 4 will be filled to the final operating level.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An inflatable roof for a vehicle, which extends in an inflated condition between a windshield frame and a rear area of the vehicle body, the roof being divided into a plurality of air chambers, wherein the roof has air chambers with different operating pressure levels, all of said different operating pressure levels being greater than an atmospheric pressure level.

2. An inflatable roof according to claim 1, wherein the roof has a frame support structure and other air chambers, said frame support structure consisting of several air chambers determining the shape of the roof with a significantly higher pressure level existing in the several air chambers of the frame support structure than in the other air chambers situated in-between.

3. An inflatable roof according to claim 2, wherein the frame support structure of the roof is composed of three mutually independent air chambers.

4. An inflatable roof according to claim 2, wherein said roof has a circumference, and wherein a first air chamber of the frame support structure extends along the circumference of the roof.

5. An inflatable roof according to claim 4, wherein a second air chamber of the frame support structure is composed of a longitudinally directed section which extends approximately in the vehicle center, and of a transversely extending section which is arranged adjacent to an upper edge of a rear window, the transversely extending section having, two laterally exterior areas which are divided in each case into two arms which extend at an angle with respect to one another.

6. An inflatable roof according to claim 5, wherein end sections of the second air chamber extend to the first air chamber.

7. An inflatable roof according to claim 5, wherein a third air chamber of the frame support structure is composed of two cross-shaped sections, each cross-shaped section extending between the first air chamber and the second air chamber.

8. An inflatable roof according to claim 2, wherein the roof has two mutually independent low pressure air chamber systems with a significantly lower operating pressure than the operating pressure of the frame support structure, each low pressure air chamber system consisting of several air chambers which are connected with one another and which extends in spaces formed between the air chambers of the frame support structure.

9. An inflatable roof according to claim 8 wherein two adjacent air chambers of the low pressure air chamber system are in an operative connection with one another by means of a connecting line, the connecting line extending through an air chamber of the frame support structure.

10. An inflatable roof according to claim 1, wherein the inflatable roof further comprises shaping elements which extend in the transverse direction of the vehicle.

11. An inflatable roof according to claim 10, wherein the shaping elements are formed by slats made of plastic.

12. An inflatable roof according to claim 11, wherein the slats 38 are arranged in receiving pockets of the roof.

13. An inflatable roof according to claim 11, wherein the slats have areas with different cross-sections.

14. An inflatable roof according to claim 1, wherein a first air chamber of the frame support structure in the area of a windshield frame and of a rear area has a bead-shaped end area which can be inserted into an undercut receiving device of the windshield frame and of the rear area, and wherein, inside the bead-shaped end area, devices are provided which fix the inflated end area inside the receiving device.

15. An inflatable roof according to claim 14, wherein a flexible tube is inserted into the bead-shaped receiving device.

16. An inflatable roof according to claim 14, wherein the device is formed by a plastic triangle which, at the same time, is used as an introducing aid for the bead-shaped end area into the receiving device.

17. An inflatable roof according to claim 3, wherein said roof has a circumference, and wherein a first air chamber of the frame support structure extends along the circumference of the roof.

18. An inflatable roof according to claim 17, wherein a second air chamber of the frame support structure is composed of a longitudinally directed section which extends approximately in the vehicle center, and of a transversely extending section which is arranged adjacent to an upper edge of a rear window, the transversely extending section having two laterally exterior areas which are divided in each case into two arms which extend at an angle with respect to one another.

19. An inflatable roof according to claim 17, wherein the roof has two mutually independent low pressure air chamber systems with a significantly lower operating pressure than the operating pressure of the frame supporting structure, each low pressure air chamber system consisting of several air chambers which are connected with one another and which extend in the spaces between the three air chambers of the frame or supporting structure.

20. An inflatable roof according to claim 19, wherein two adjacent air chambers of the low pressure air chamber system are in an operative connection with one another by means of a connecting line, the connecting line extending through an air chamber of the frame support structure.

21. An inflatable roof according to claim 8, wherein the inflatable roof further comprises shaping elements which extend in the transverse direction of the vehicle.

22. An inflatable roof according to claim 19, wherein the inflatable roof further comprises shaping elements which extend in the transverse direction of the vehicle.

* * * * *